(12) United States Patent
Einstein

(10) Patent No.: US 7,564,402 B2
(45) Date of Patent: Jul. 21, 2009

(54) INFORMATION GATHERING USING REFLECTED SATELLITE SIGNALS

(75) Inventor: Bruce A. Einstein, Wyndmoor, PA (US)

(73) Assignee: Drexel University, Philadelphia, PA (US)

( * ) Notice: Subject to any disclaimer, the term of this patent is extended or adjusted under 35 U.S.C. 154(b) by 151 days.

(21) Appl. No.: 11/187,133

(22) Filed: Jul. 22, 2005

(65) Prior Publication Data

US 2006/0077094 A1 Apr. 13, 2006

Related U.S. Application Data

(60) Provisional application No. 60/591,200, filed on Jul. 26, 2004.

(51) Int. Cl.
*H01S 1/00* (2006.01)
(52) U.S. Cl. .................................. 342/357.06
(58) Field of Classification Search ............ 342/357.06, 342/357.15, 353; 455/65
See application file for complete search history.

(56) References Cited

U.S. PATENT DOCUMENTS 5,949,364 A * 9/1999 Katzberg et al. .......... 342/25 A

| | | |
|---|---|---|
| 6,334,086 B1 | 12/2001 | Park et al. |
| 6,362,782 B1 * | 3/2002 | Greenspan et al. .......... 342/453 |
| 6,615,130 B2 | 9/2003 | Myr |
| 6,650,948 B1 | 11/2003 | Atkinson et al. |
| 7,167,123 B2 * | 1/2007 | Hausner et al. ................ 342/22 |
| 2002/0050944 A1 * | 5/2002 | Sheynblat et al. ....... 342/357.06 |
| 2003/0052821 A1 * | 3/2003 | Holt ............................ 342/453 |
| 2003/0171872 A1 | 9/2003 | Balasubramanian et al. |

* cited by examiner

*Primary Examiner*—Thomas H Tarcza
*Assistant Examiner*—Nga X Nguyen
(74) *Attorney, Agent, or Firm*—Knoble, Yoshida & Dunleavy LLC

(57) ABSTRACT

A method of using reflected satellite signals, such as GPS signals or high orbit satellite signals, to determine information including the steps of: receiving direct and reflected satellite signals from the same satellite at one or more receivers, comparing a power of said reflected satellite signal with a power of the direct satellite signal from the same satellite to obtain a ratio, comparing the ratio to at least one calibrated ratio obtained from calibration data; and determining information from a result of said step of comparing said ratios. The method is useful for the purpose of determining information about the presence or absence of an object, person or animal, the volume of motor vehicle or foot traffic, the aridity of land, monitoring an area for intruders, monitoring parking lots and enhancing security systems.

21 Claims, 15 Drawing Sheets

Circuit Diagram of RF Stage for GPS Receiver

Circuit Diagram of IF stage for GPS Receiver

Results

| Test Trial # | Date | Temp | Weather | Location | (%) |
|---|---|---|---|---|---|
| 1 | 4/1/03 | 54 | Rain | 38th St. | 81.67 |
| 2 | 4/10/03 | 55 | Cloudy | 32nd St. | 93.33 |
| 3 | 4/20/03 | 60 | Sunny | 38th St. | 86.67 |
| 4 | 5/4/03 | 64 | Sunny | 38th St. | 95.00 |
| 5 | 5/4/03 | 64 | Sunny | 38th St. | 100.00 |
| 6 | 5/4/03 | 64 | Sunny | 38th St. | 98.33 |

FIG. 14

INFORMATION GATHERING USING REFLECTED SATELLITE SIGNALS

This application claims benefit under 35 U.S.C. §119(e) of U.S. Provisional Application No. 60/591,200, filed Jul. 26, 2004, the entire disclosure of which is hereby incorporated by reference as if set forth fully herein.

BACKGROUND OF THE INVENTION

1. Field of the Invention

The invention relates to the use of reflected signals from satellites to gather information. In particular, the invention relates to the utilization of reflected satellite signals to determine information about traffic or about a geographic area.

2. Description of the Related Technology

There are various types of satellites that transmit signals to the Earth. Some examples of satellites that transmit signals to the Earth are high orbit satellites (e.g. a DirecTV® satellite), middle orbit satellites (e.g. a Global Positioning System (GPS) satellite), and low orbit satellites (e.g. low Earth orbit (LEOS) satellite altimetry systems).

High orbit satellites, such as DirecTV® are geo-stationary satellites that are positioned at an altitude of over 35,000 km. High orbit satellites transmit a constant output of signals.

Low orbit satellites, such as LEOS satellite altimetry systems have an altitude of below 1,500 km. Low orbit satellites are non geo-stationary. Low orbit satellites transmit a rapidly changing output of signals.

A middle orbit type of satellite has an altitude of around 1,500 km to 35,000 km. They are pseudo geo-stationary and can provide a stable output of signals. GPS is a satellite-based global navigation system that was made possible by the U.S. Department of Defense. The 24 GPS satellites or space vehicles ("SV's") are traveling at a constant speed of roughly 7,000 miles an hour, in a nearly circular orbit at a height of about 12,500 miles (or 20,200 km) above the Earth's surface, and make two complete orbits every 24 hours. The satellites, which transmit GPS signals down to the Earth's surface are positioned in such a way that signals from at least 4 satellites are detectable at any place with a fairly good view of the sky at any moment of time. The GPS receivers detect and process the GPS signals and determine position (latitude, longitude, and altitude), velocity and precise time from the information bearing signals. With an appropriately programmed GPS receiver, the location of the GPS receiver can be determined by triangulation.

To get a better accuracy or precision, civilians may use a technology called Differential GPS ("DGPS"). DGPS works by placing a high performance GPS receiver (also known as reference station) at a known location, where the errors in the satellite signals are determined. The reference station then sends correction signals to GPS receivers. The GPS receivers improve accuracy by eliminating most of the satellite signal errors through use of the information sent by the reference station.

GPS technology has proven invaluable for both military and civilian purposes such as mapping, surveying, tracking, and navigation.

Since GPS was designed for use by an unlimited number of users, military or civilians, at the same time, the structure of the signals, as well the structure of the receiver is quite complex. Each of the GPS satellites continuously and simultaneously transmits two microwave signals in the UHF band, denoted by $L_1$ and $L_2$ respectively. The mathematical models for $L_1$ and $L_2$ signals ($S_{L1}(t)$ and $S_{L2}(t)$ respectively) are as follows:

$$S_{L1}(t) = \sqrt{2}\sqrt{P_I}d(t)c(t)\cos(2\pi f_1 t + \theta_1) + \sqrt{2}\sqrt{P_Q}d(t)p(t)\sin(2\pi f_1 t + \theta_1)$$

$$S_{L2}(t) = \sqrt{2}\sqrt{P_Q}d(t)p(t)\sin(2\pi f_2 t + \theta_2)$$

where $P_I$ is the in-phase carrier power, $P_Q$ is the quadrature-phase power, d(t) is the 50-bps navigation data stream, c(t) is the pseudo-random coarse/acquisition code (or C/A-code), p(t) is the pseudo-random protected code (or P-code), $\theta_1$ and $\theta_2$ are arbitrary phase angles, $f_1$=1575.42 MHz and $f_2$=1227.60 MHz. The carrier of $L_1$ is composed of an in-phase and a quadrature component, whereas $L_2$ contains only the quadrature part. The in-phase component is bi-phase modulated by the data stream and the C/A-code. The data stream contains information such as satellite almanac data (used to determine which satellites are visible at a given location), satellite ephemeris data (used to determine the position of the satellites), and signal timing data. The C/A-code is a 1023-chip pseudorandom sequence, has a period of 1 ms (thus, the chipping rate is 1.023 MHz), and is unique for each satellite. Its purpose is to spread the spectrum of the data message and to prevent co-channel interference from other satellites. Different from the in-phase part, the quadrature component is modulated by P-code. The P-code is also pseudorandom, but has a much longer period (1-week) and a higher chipping rate (10.23-MHz). The use of P-code offers better jamming protection, more resistance to errors, and thus better accuracy than just with the C/A-code. However, civilians have no access to the P-code since it is encrypted. As a result, civilian applications use $L_1$ only. The power a user receives on the ground for $L_1$ is expected to be at least −134.1 dBm (or $10^{-13.41}$ mW, Table 1) prior to adding any gains of the receiver.

TABLE 1

Link Power Budget of GPS Signals

| Parameters | $L_1$ | | $L_2$ | |
|---|---|---|---|---|
| Sending End (Satellite) | | | | |
| Transmitted Power | 10.72 | W or | 6.61 | W or |
|  | 40.3 | dBm | 38.2 | dBm |
| Antenna Gain | 13.5 | dB | 11.5 | dB |
| EIRP | 53.8 | dBm | 49.7 | dBm |
| Loss | | | | |
| Polarization Mismatch Loss | 3.4 | dB | 4.4 | dB |
| Atmospheric Loss | 2.0 | dB | 2.0 | dB |
| Free-Space Propagation Loss | 182.5 | dB | 180.3 | dB |
| Minimum User Received Power on Ground without Antenna Gain | −134.1 | dBm | −137.0 | dBm |

Note that in Table 1: 1) EIRP (effective isotropic radiated power) is obtained by adding transmitted power in dBm and antenna gain in dB; 2) the free space loss is calculated and shown in Table 2; and 3) the minimum user received power is determined by subtracting all losses from EIRP.

TABLE 2

Free Space Loss Calculation

Free-Space Propagation Loss Calculation
> restart; Loss:=(4*Pi*d/lambda)^2;

$$\text{Loss} := 16 \frac{\pi^2 d^2}{\lambda^2}$$

> lambda:=c/f: Loss;

TABLE 2-continued

Free Space Loss Calculation $$16\frac{\pi^2 d^2 f^2}{c^2}$$

Using the actual parameters: speed of light c = 30000 km/s, frequency of L1 carrier f = 1575.42 MHz, distance from the satellite to the ground d = 20200 km,
> c:=3E8: f:=1575.42E6: d:=20200E3: Loss:=evalf(Loss);
                Loss := .1776939602 $10^{19}$
> LossDB:=10*log10(Loss);
                LossDB := 182.4967267

The structure of a GPS receiver is shown in FIG. 1. The GPS signal is processed in a number of stages: once at the RF (Radio Frequency) stage and twice at the IF (Intermediate Frequency) stages. In those stages, the signal is amplified and/or down-converted a few times before it is digitized. The down-conversions are done for the purposes of amplification, noise filtering, and ease of digitization. The down-conversion is essentially the process of mixing the incoming and the local oscillator (LO) signals, which results in a signal at a lower frequency or at IF (IF is the difference between the incoming and LO frequencies). The number of stages of IF signal-processing can be one or more. But, for a relatively low cost receiver, multiple IF processing is usually preferred. The digitized signal is then further processed to give navigation information such as position, velocity, and time.

Various methods for using GPS signals to assist in determining traffic information have been previously suggested. Some of the previous methods are discussed below.

U.S. Pat. No. 6,650,948 B1 to Atkinson discloses a method for monitoring traffic flow. GPS signals are received by devices placed aboard vehicles. This information received from the GPS signals is then used to create probability vectors to predict traffic patterns. This implementation requires each vehicle to have a GPS receiver on board.

U.S. Pat. No. 6,615,130 B2 to Myr discloses a system for using GPS signals for determining traffic related information. A central traffic unit correlates various incoming information from vehicles on a road. Vehicles receive GPS signals and these signals are then transmitted to a central traffic unit. The central traffic unit then uses this information to calculate the density and speed of traffic on a road. This system requires that the monitored vehicles have GPS receivers and transmitters.

U.S. Pat. No. 6,334,086 B1 to Park discloses a system for using GPS signals to determine traffic patterns. Probe vehicles are used to receive GPS signals, and stationary devices are employed at various locations to receive signals from a probe vehicle in order to identify a road on which a car is traveling. This system requires the monitored vehicles to have receivers and transmitters and further requires placement of a number of stationary devices to identify the particular roads on which the vehicles are traveling.

While the systems disclosed above utilize GPS signals to determine information about traffic, each of these systems requires the active participation of vehicles at least to receive GPS signals, and, in some cases, to transmit signals as well. Placement of GPS receivers and/or transmitters in individual vehicles to gather traffic data is a costly way of determining traffic information. In order for these devices to be effective, enough monitored vehicles must be present on any given road in order to give a statistically reliable result.

U.S. Patent Publication No. 20030171872 by Balasubramanian et al. discloses the use of GPS to determine the condition of a road. The device uses reflected GPS signals to determine road surface conditions. The signals are used to determine whether the scanned surface is wet, dry, or is covered by ice, snow, sand or the like. The receiver of the signals may be mounted on a vehicle or provided at or near the location of the road to be monitored. When provided proximate to the road, a signal is sent to a passing vehicle that has an apparatus on board to evaluate the signal. This will inform the vehicle occupant as to the condition of the road.

While the Balasubramanian publication discloses detecting a condition of a road using reflected signals, using the signals to determine information about the traffic on that road is not contemplated.

Therefore, there remains a need to provide an improved method of determining information about traffic without requiring each monitored vehicle to have one or more devices installed in the vehicle in order to participate in the traffic monitoring process.

There also remains a need to provide a more efficient method of determining information about a particular geographic area.

SUMMARY OF THE INVENTION

According to a first aspect of the invention, a method of using reflected satellite signals to determine information is provided. The method includes receiving direct and reflected satellite signals from the same satellite at one or more receivers. Comparing a power of the reflected satellite signal with a power of the direct satellite signal from the same satellite to obtain a ratio. Comparing the ratio to at least one calibrated ratio obtained from calibration data and determining information from a result of the step of comparing said ratios.

According to a second aspect of the invention, a method of using reflected satellite signals to determine information is provided. The method includes the steps of receiving reflected satellite signals from the same satellite at one or more receivers. Determining one or more of a power, a Doppler shift or a phase of the reflected satellite signal. Comparing one or more of the determined power, Doppler shift or phase of the reflected satellite signal to at least one calibrated value of a power, Doppler shift or phase obtained from calibration data and determining information from a result of the step of comparing the determined power, Doppler shift or phase.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described embodiments of the invention.

BRIEF DESCRIPTION OF THE DRAWINGS

FIG. 14 is a chart summarizing the results of the test data received for determining a number of vehicles on a road shown in FIG. 13.

DETAILED DESCRIPTION OF THE PREFERRED EMBODIMENT(S)

Figure 1A:
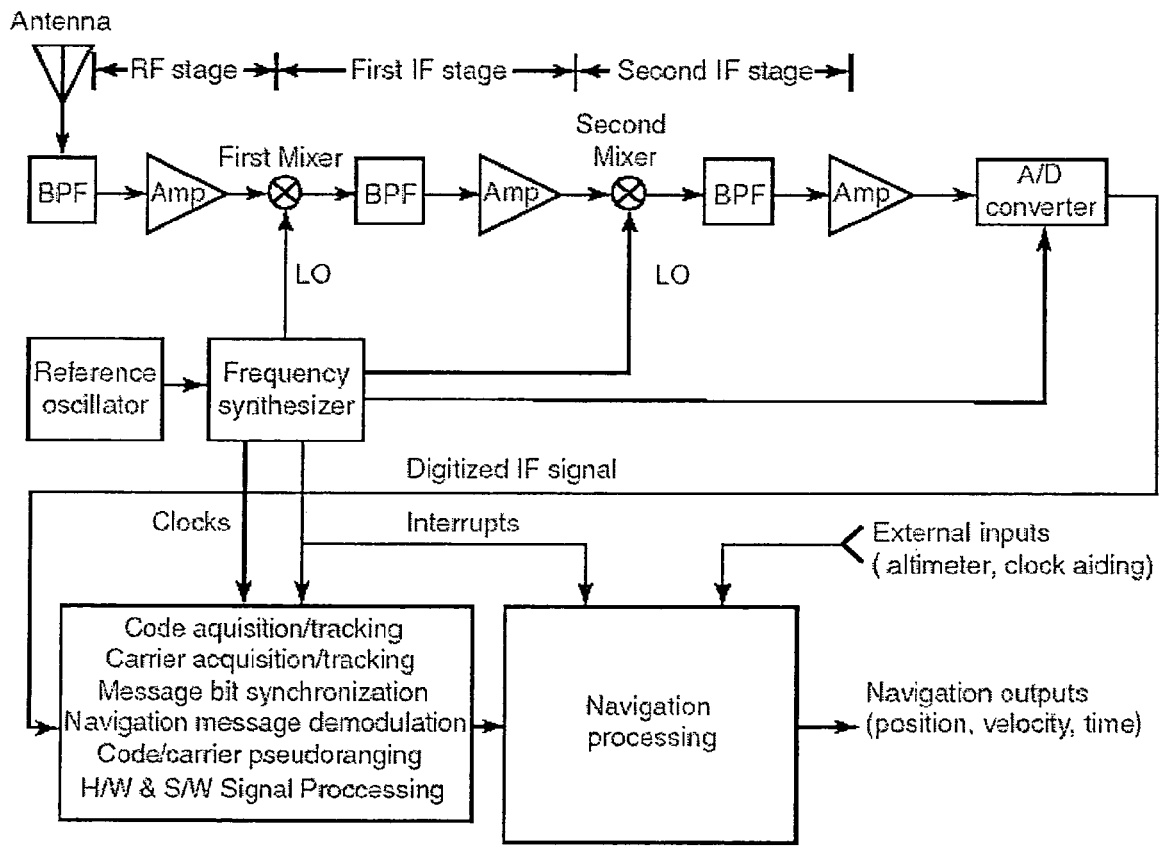
FIG. 1A is a schematic diagram of a prior art GPS signal receiver.
Figure 1B:
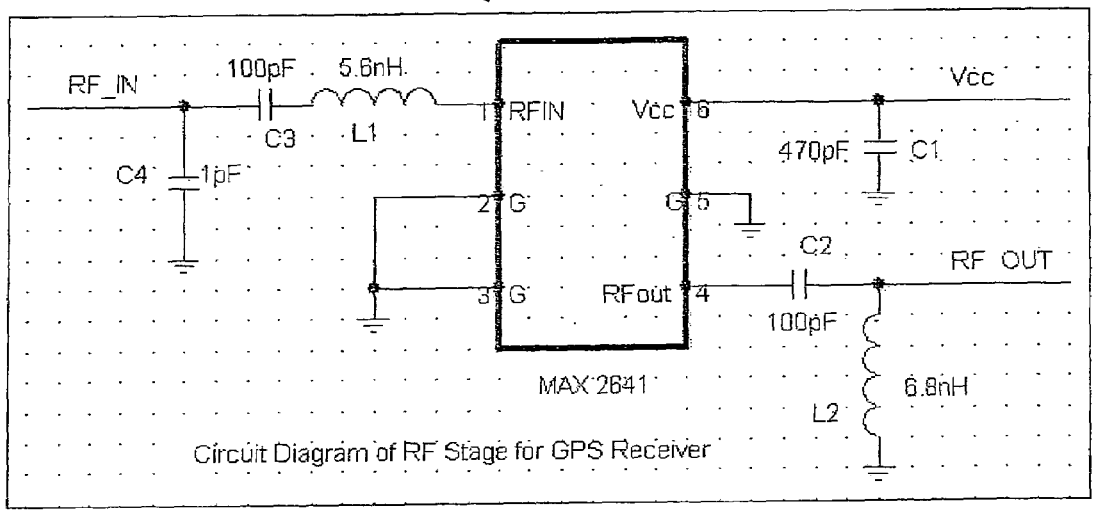
FIG. 1B is a circuit diagram of the RF Stage of the GPS signal receiver of FIG. 1A.
Figure 1C:
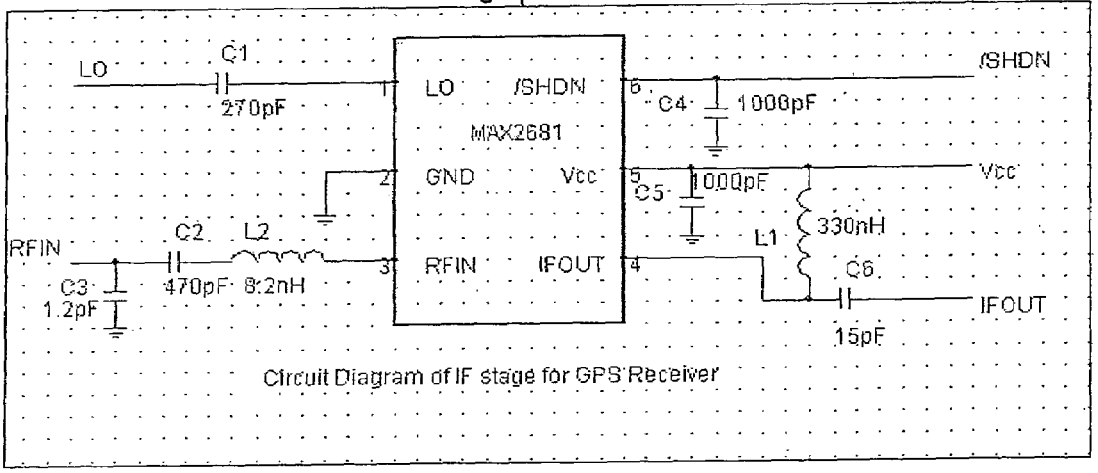
FIG. 1C is a circuit diagram of the IF Stage of the GPS signal receiver of FIG. 1A.
Figure 2:
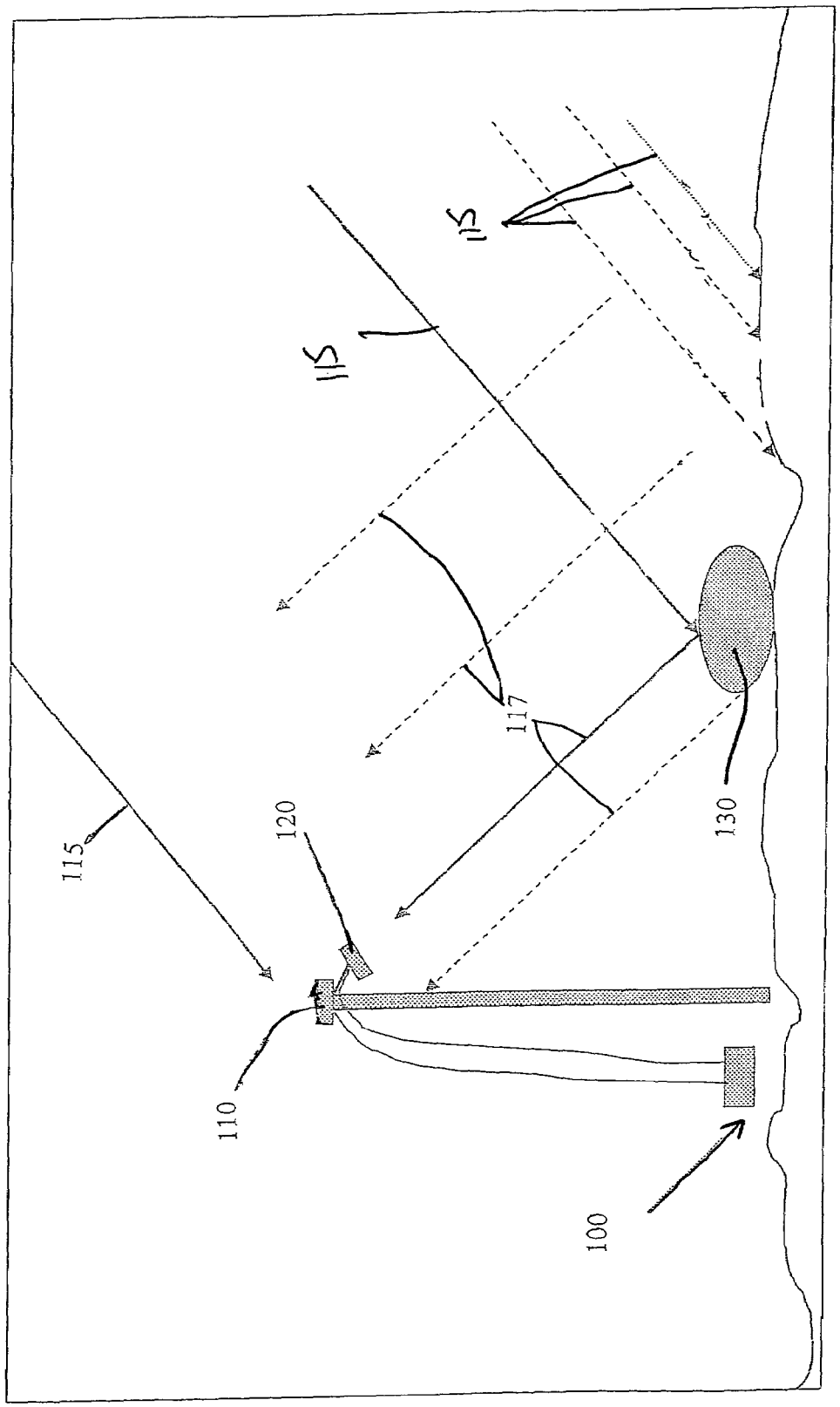
FIG. 2 is a depiction of how reflected GPS signals are received.

Referring now to the drawings, wherein like reference numerals designate corresponding structure throughout the several views, and referring now to FIG. 2, a general depiction of the operation of a system employing reflected GPS signals is shown. Although in the disclosure provided below one type of satellite is primarily discussed, it to be understood that other types of satellites and their signals (i.e. low, middle, or high orbit satellites) may be used in place of GPS satellites and their signals.

Returning to FIG. 2, GPS signals 115 are transmitted from GPS satellites. GPS signals 115 contain information regarding the time and position of the satellite from which GPS signals 115 are emitted. GPS signals 115 strike both the ground and various objects such as object 130. Different objects have different reflectivity's for GPS signals. The different reflectivity's of objects makes it possible to use reflected GPS signals 117 to determine information regarding a particular object, area or location. In one embodiment, the power of the reflected GPS signal is employed to determine information about a particular object, area or location.

Still referring to FIG. 2, reflected GPS signals 117 are received at receiver 100 via left-hand circularly polarized (LHCP) antenna 120 and direct GPS signals 115 are received at right-hand circularly polarized (RHCP) antenna 110. RHCP antenna 110 is oriented towards the sky in order to receive direct GPS signals 117. LHCP antenna 120 is oriented towards the ground in order to receive reflected GPS signals 117. Reflected GPS signals 117 from the ground and reflected GPS signals from object 130 have different properties due to the difference in reflectivity's of the ground and object 130.

Figure 3:
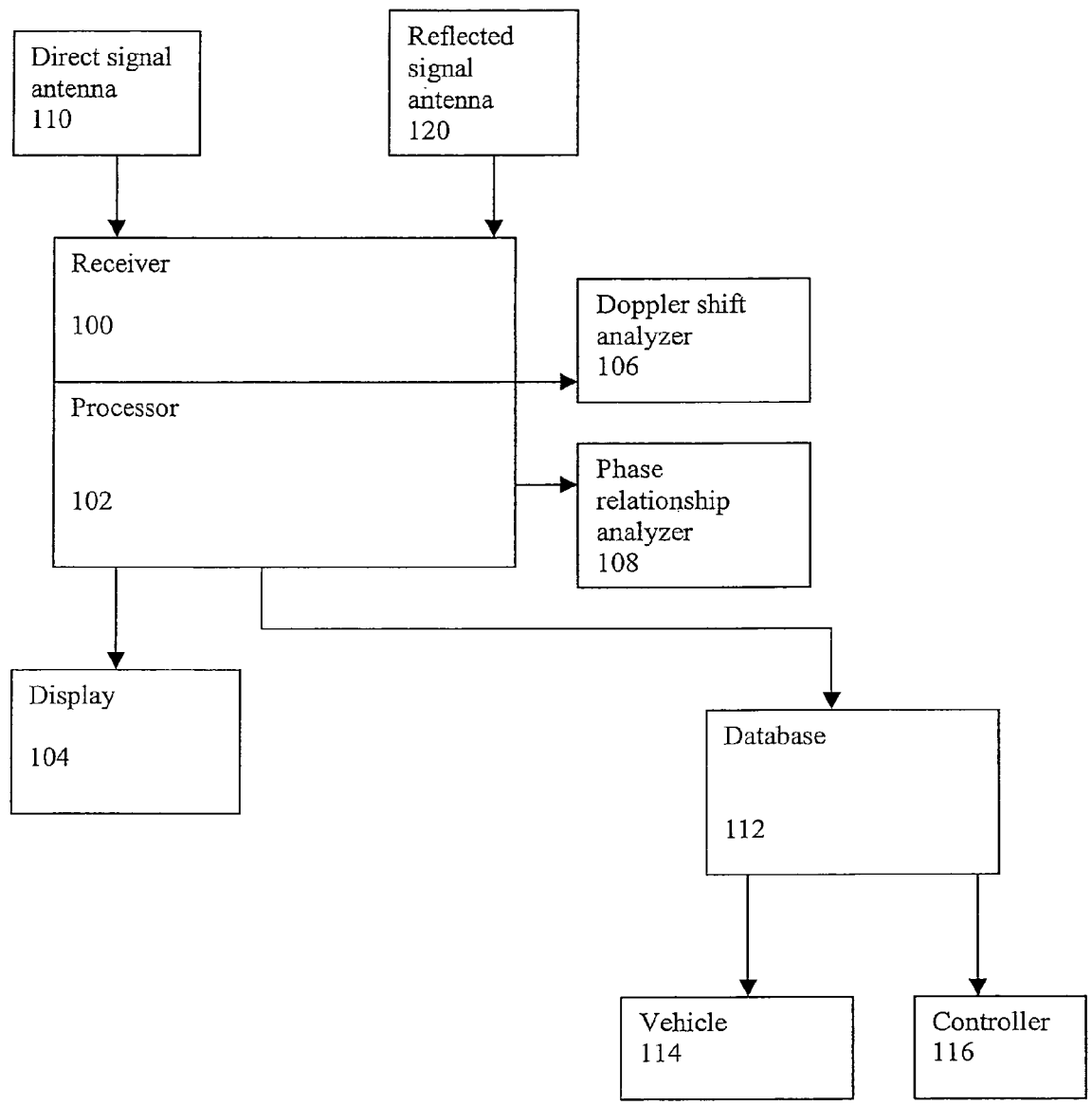
FIG. 3 is a block diagram showing a system for receiving reflected GPS signals.

FIG. 3 shows a block diagram of the various components that are used in receiving reflected GPS signals 117 and direct GPS signals 115. RHCP antenna 110 is connected to receiver 100 and is oriented to receive direct GPS signals 117. LHCP antenna 120 is connected to receiver 100 and is oriented to receive reflected GPS signals 117.

Receiver 100 may be connected to a processor 102 for processing information received from antennas 110 and 120. Optionally, processor 102 may be provided with a display 104 to display results of the information processing. The system may also be provided with a Doppler shift analyzer 106. Doppler shift analyzer 106 assists in analyzing the Doppler shift of reflected GPS signals 117. This analysis can be helpful in gathering information about moving objects. For example, the Doppler shift may be used to determine the speed of a moving object, as well as whether the object is approaching or moving away from receiver 100.

The system may also be provided with a phase relationship analyzer 108. Phase relationship analyzer 108 assists with imaging of objects, as well as determining when an object has come within range for imaging. Imaging may be important for tracking an object. As a result, the system of the present invention may employ one or more of power, phase and polarization of the signal for the purpose of determining information from the signal. However, only one or two of these three parameters may be used in a particular case to achieve the desired result, depending upon the number of possible decisions, the level of accuracy required, as well as other factors.

Processor 102 may also be connected to a database 112. Database 112 can receive and store information from receiver 100 or information generated by processor 102. Database 112 can receive data from receiver 100 and transmit the data to other databases, or act as a server by transmitting data to requesting clients. The storing of processed information in database 112, based on reflected signals 117 can be used to provide a log of events that occur in a given location. Additionally, database 112 may be located at the same location as receiver 100 to provide on-site storage and retrieval of log information, or at a remote location. Database 112 may also assist in storing information to help in performing a learning algorithm in conjunction with processing the received data. Database 112 may be connected to a controller 116 or to a vehicle 114, or may transmit data to a controller 116 or vehicle 114, periodically or upon request.

When database 112 is connected to controller 116, controller 116 may use the resultant data to perform a relevant operation. For instance, if aridity of land was being detected for gardening purposes, and the land was determined to be too dry, controller 116 may activate a sprinkler system. Alternatively, if the system is being used for security purposes, controller 116 may trigger an alarm, activate a security camera, or send a notification in response to information from the system.

Figure 4:
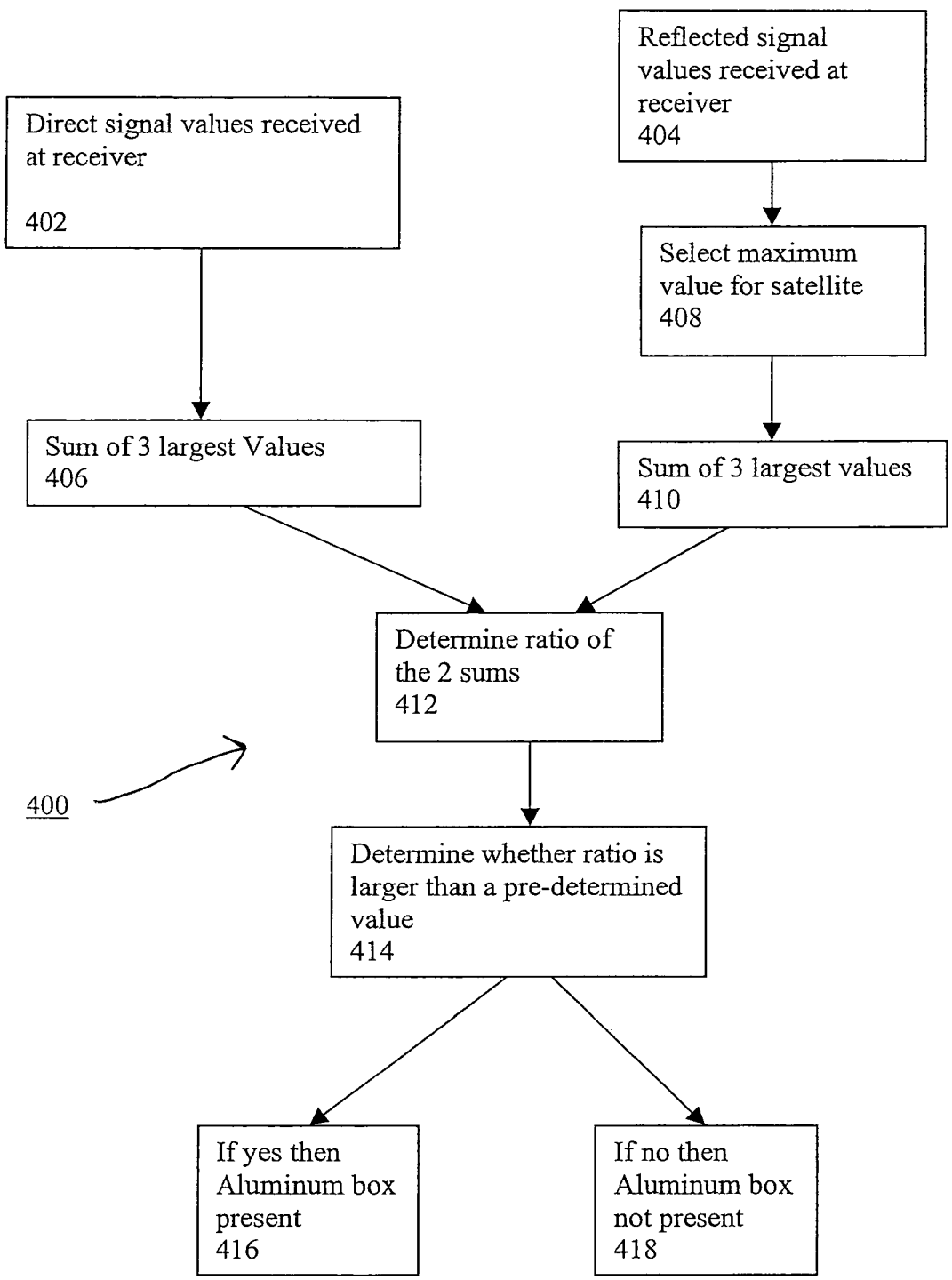
FIG. 4 is a flow chart showing a method of detecting the presence or absence of an aluminum-covered box.
Figure 5:
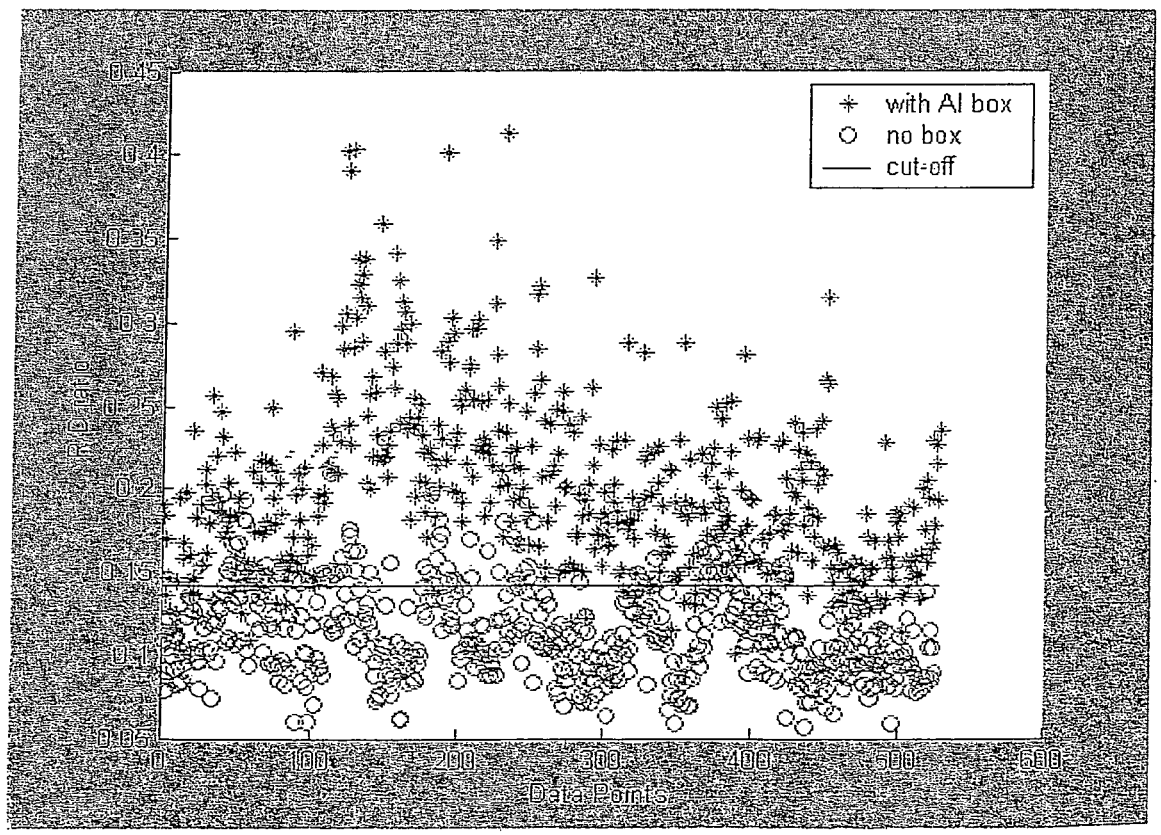
FIG. 5 is graphical depiction of calibration tests used to calibrate the apparatus for determining the presence of an aluminum-covered box.

FIGS. 4 and 5 further illustrate how the system operates through an example using a box covered in aluminum foil. In this example, the box was placed in an area for detection. FIG. 4 shows a flowchart of aluminum-covered box detection method 400. Aluminum-covered box detection method 400 makes a determination as to whether the aluminum-covered box was present or not, based on information received from the GPS. This exemplified method can be used for the detection of a wide variety of objects, with the only limitation being that the object to be detected must reflect a GPS signal and thereby provide a reflected GPS signal that is distinguishable from the surroundings. Step 402 involves receiving 6 direct GPS signal values per each one-second data-logging interval at receiver 100 via RCHP direct signal antenna 110. Although the provided example uses six values, more or less values can also be used within the scope of the present invention.

Step 404 involves receiving reflected GPS signals at receiver 100 via LCHP reflected signal antenna 120. In the example, 192 reflected values per each one-second data-logging interval were used. Again the number of reflected values may be varied to more or less than 192 within the scope of the present invention. Due to the relatively weak reflected GPS signals, it may be necessary to employ sensitive receivers to receive the reflected signal. Such receivers could be based on receipt any of optical, microwave, radar or ultrasound signals.

To employ the data for decision-making, it is preferably to subject the data to a data reduction step. A suitable data reduction step is described with reference to FIGS. 4-5. Step 406 calculates the sum of the three largest values taken from RCHP direct signal antenna 110 using processor 102. In step 408 the maximum reflected GPS value is selected from each satellite from which a reflected GPS signal 117 is received. Alternatively, more values can be used for each satellite than just the maximum value, and the average, or mean of the values received can be used instead. Step 410 calculates the sum of the three largest values received from the LCHP reflected signal antenna 120 using processor 102. At step 412, processor 102 calculates the ratio of the sums of the largest values received. The ratio is then compared at step 414 to a predetermined calibration value. The predetermined calibration value is a value that represents the results of calibration tests performed to indicate the presence or absence of a particular object. At step 416, if the calculated value is larger than the predetermined calibration value, then a positive indication is given indicating the presence of the aluminum-covered box. At step 418, if the calculated value is smaller than the predetermined calibration value, then a negative indication is given indicating the absence of the aluminum-covered box.

The present invention is not limited to this specific data reduction method. Other suitable data reduction methods may also be employed within the scope of the present invention in order to reduce the data to a more manageable form for manipulation and decision-making. FIG. 5 shows a graphical depiction of data gathered and reduced using the apparatus of FIG. 4. The data points displaced correspond to test ratios obtained from the data reduction method. Data obtained using the apparatus of FIG. 4, can initially be used to calibrate the system. Once the system has been calibrated, data can be compared to the calibrated data or information obtained therefrom, for the purpose of decision-making. In an alternative embodiment, the system can include a learning mode or learning algorithm, whereby newly-acquired data can be used to adjust the information obtained from initial calibration of the system to cause the system to learn from new data and generate more precise results.

Figure 6:
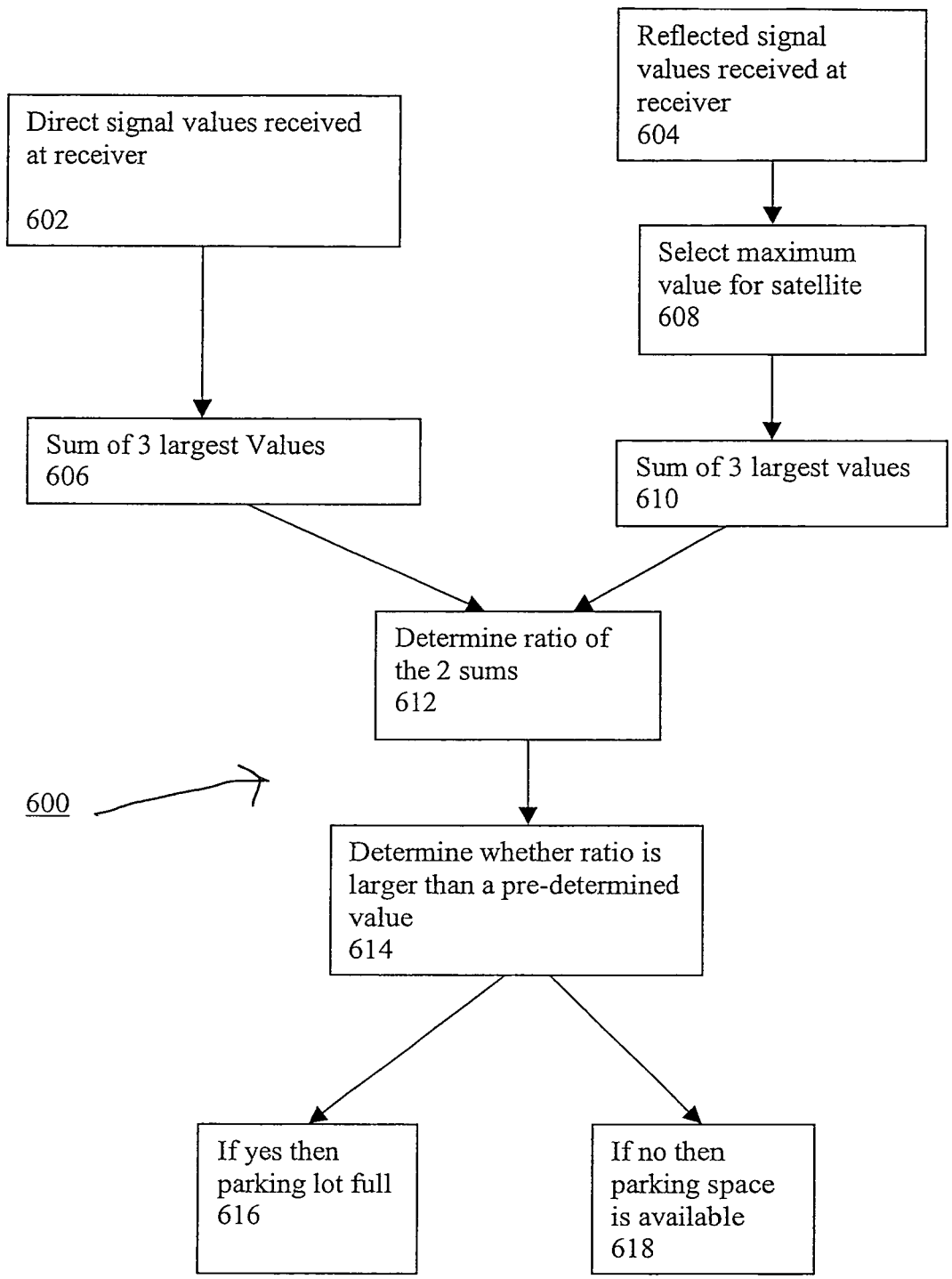
FIG. 6 is a flow chart showing a method for determining the availability of parking spaces.

FIG. 6 shows a method 600 for determining availability of parking lot space. Method 600 is described in the context of determining whether a particular parking lot is full. This method could also be used for determining whether or not a certain event or area is overcrowded with people, for example at an outdoor festival or to monitor compliance with fire safety regulations.

Step 602 of method 600, involves receiving six direct GPS signal values per each one-second data-logging interval at receiver 100 via RCHP direct signal antenna 110. Although in the example provided, six values are employed, more or less values can also be used within the scope of the present invention. Step 604 involves receiving reflected GPS signals at receiver 100 via LCHP reflected signal antenna 120. In the example, 192 reflected values per one-second data-logging interval were used. Again, the number of reflected values can be varied within the scope of the present invention.

Step 606 calculates the sum of the three largest values taken from RCHP direct signal antenna 110 using processor 102. In step 608 the maximum reflected GPS value is selected from each satellite from which a reflected GPS signal 117 is received. Alternatively, more values can be used for each satellite than just the maximum value, and the average, or mean of the values received can be used instead. Step 610 calculates the sum of the three largest values received from the reflected signal antenna 120 using processor 102. At step 612, processor 102 calculates the ratio of the sums of the three largest values from each antenna 100, 120. The ratio is then compared at step 614 to a predetermined calibration value. The predetermined calibration value is a ratio that represents the results of calibration tests performed to indicate the presence or absence of an object. At step 616, if the calculated value is larger than the predetermined calibration value, then an indication is given that the monitored parking lot is too crowded. At step 618, if the calculated value is smaller than the predetermined calibration value, then an indication is given that a parking lot still has space available.

Figure 7:
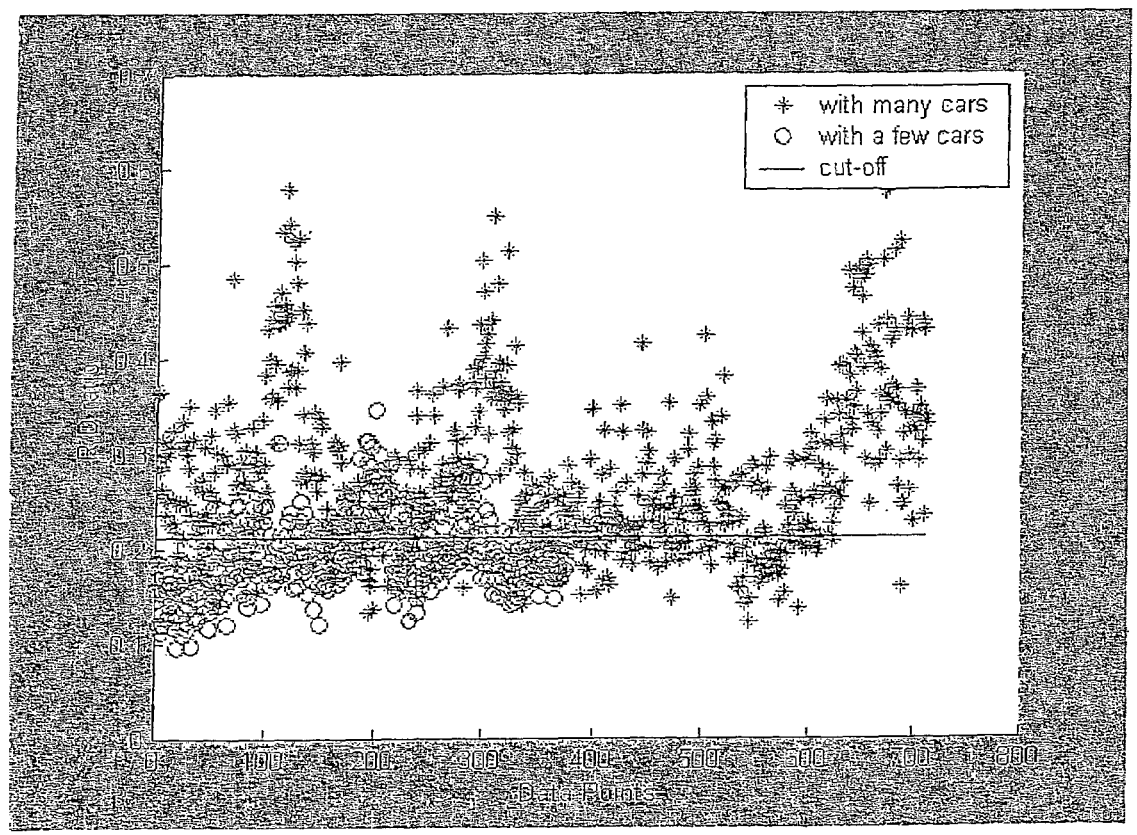
FIG. 7 is a graphical depiction of calibration tests used to calibrate the apparatus for determining availability of parking spaces.

FIG. 7 shows a graphical depiction of data obtained using the apparatus of FIG. 6. The data points displayed correspond to test ratios determined during the calibration process. In this example, calibration was done solely for the purpose of determining whether a particular parking lot is too crowded or not. It is possible to calibrate the method so that more specific information, such as exact numbers of vehicles, can be determined. It is also possible to calibrate the system based upon the effects of different weather on the reflectivity of GPS signals in order to ensure that reliable data can be obtained independent of prevailing weather conditions. This can be accomplished by having receiver 100 receive signals under different weather conditions and then by associating the received signals with the particular weather conditions under which they were received. In so doing, data analysis corrections can be made to account for changed weather patterns or other scenarios that may alter the reflected GPS signals.

Figure 8:
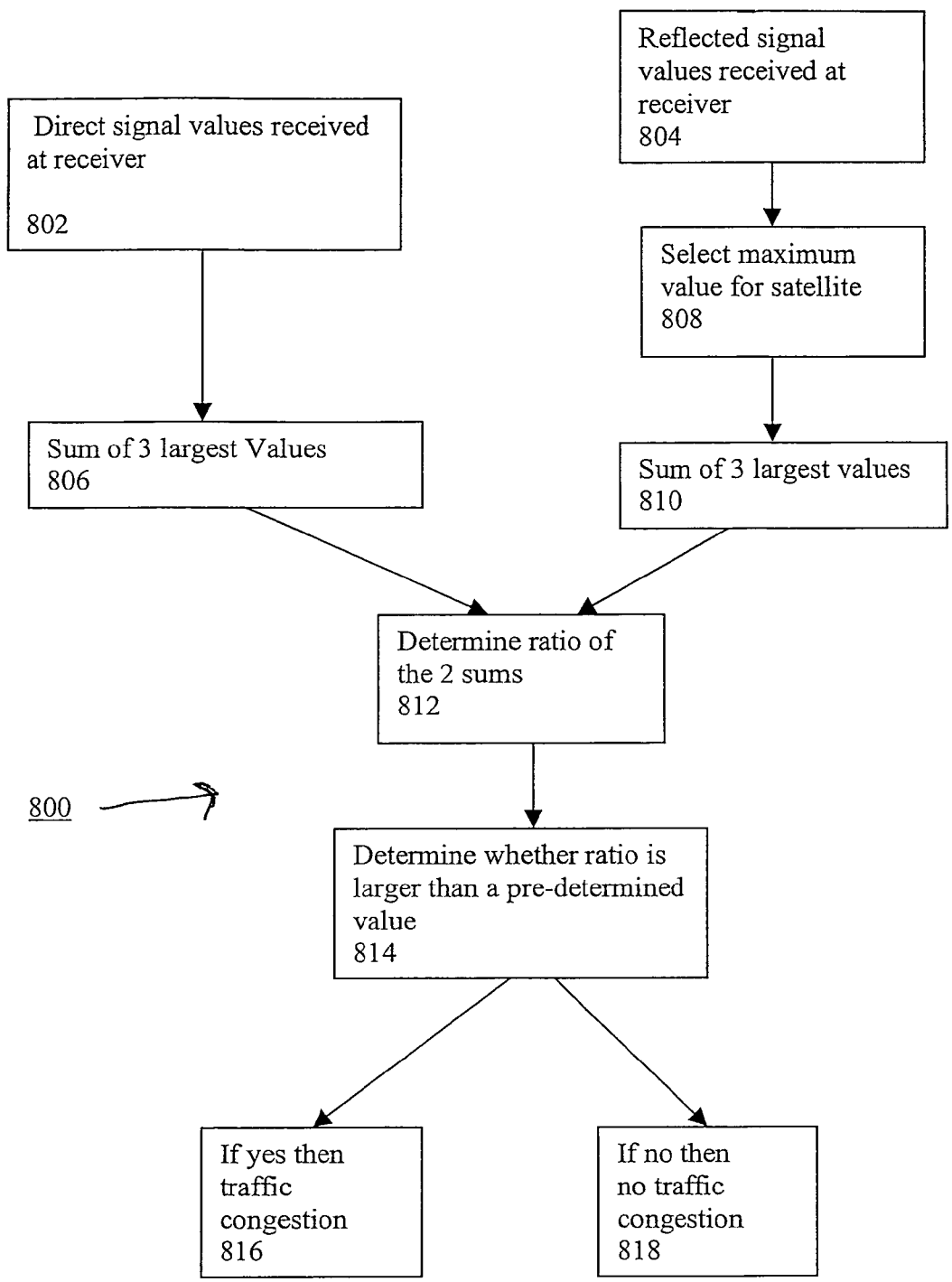
FIG. 8 is a flow chart showing a method for determining traffic information.

FIG. 8 shows a method 800 for monitoring traffic volume. Step 802 involves receiving six direct GPS signal values per one-second data-logging interval at receiver 100 via RCHP direct signal antenna 110. Again, more or less than six values of direct GPS signal can be employed within the scope of the present invention. Step 804 involves receiving reflected GPS signals at receiver 100 via LCHP reflected signal antenna 120. In the example, 192 reflected values per one-second data-logging interval were used. Again, the number of values employed can vary within the scope of the present invention.

Step 806 calculates the sum of the three largest values taken from RCHP direct signal antenna 110 using processor 102. In step 808 the maximum reflected GPS value is selected from each satellite from which a reflected GPS signal 117 is received. Alternatively, more values can be used for each satellite than just the maximum value, and the average, or mean of the values received can be used instead. Step 810 calculates the sum of the three largest values received from the LCHP reflected signal antenna 120 using processor 102.

At step 812, processor 102 calculates the ratio of the sums of the three largest values of the direct and reflected signals. The ratio is then compared at step 814 to a predetermined calibration value. The predetermined calibration value is a value that represents the results of calibration tests performed to indicate the presence of a certain number of vehicles on a road. At step 816, if the calculated value is larger than the predetermined calibration value then an indication is given that the road is congested. At step 818, if the calculated value is smaller than the predetermined calibration value then an indication is given that the road is not congested.

Adjusting the predetermined calibration value at step 814 can compensate for different amounts of traffic congestion. Furthermore, multiple predetermined calibration values can be provided based on varying levels of traffic in order to give a more specific indication of the amount of traffic on a road. In the event that method 800 employs more than one predetermined calibration value, step 814 will compare the ratio obtained at step 812 to each of the predetermined calibration values and determine the degree of congestion by finding the lowest predetermined calibration value that is exceeded by the calculated value. The result is then shown on display 104, or transmitted to database 112. The result can also be transmitted to those interested in knowing the status of traffic.

For example, cellular, satellite or wireless transmission modes can be used to transmit information to a remote location, such as a central data-monitoring center, or to a web server that makes the information available to interested persons via a web site interface. Alternatively, the information can be sent directly via electronic transmission, facsimile or telephonic notification to interested persons or entities.

Figure 9:
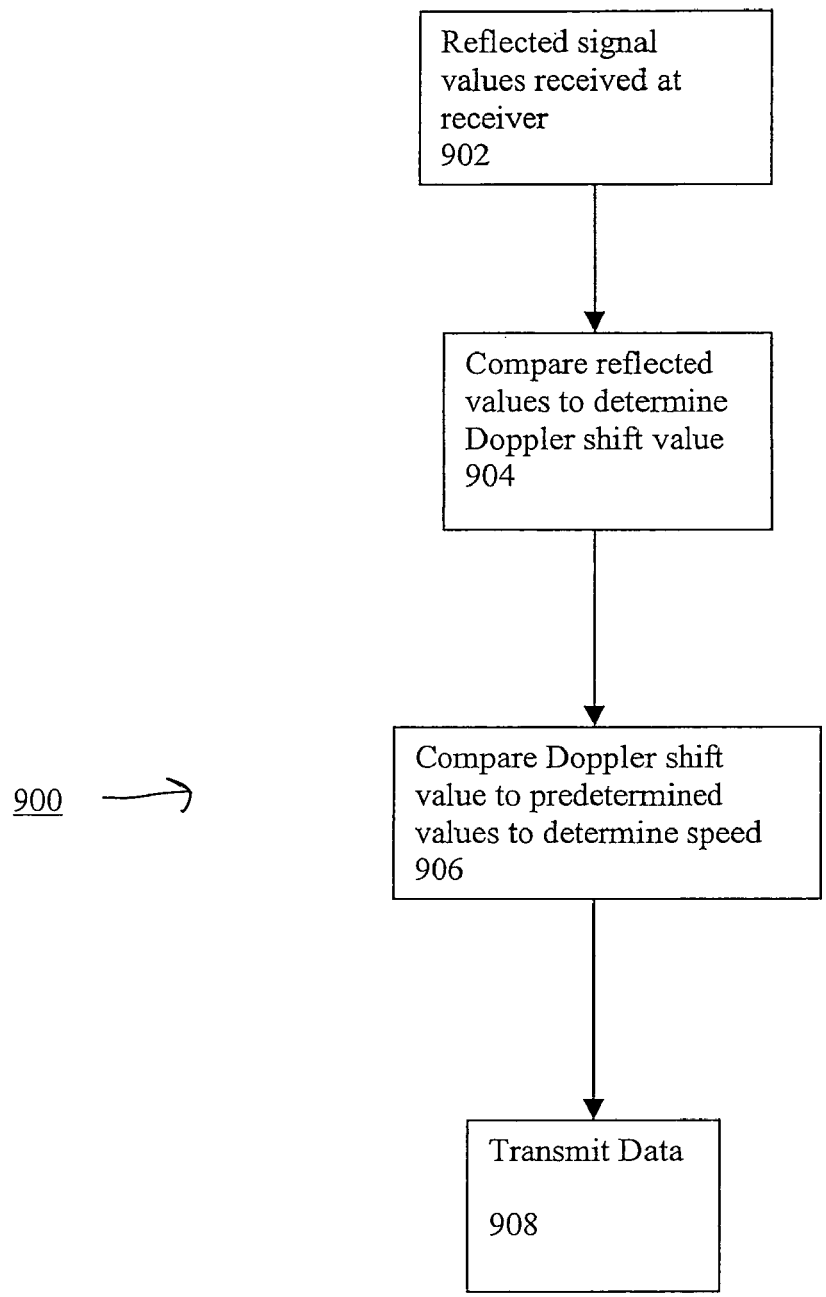
FIG. 9 is a flow chart showing a method that employs Doppler shift analysis.

The speed of traffic can also be ascertained by implementing the Doppler shift analysis method 900 shown in FIG. 9. At step 902 reflected GPS signals are received via LCHP reflected signal antenna 120. At step 904 the reflected values at different times, are compared in order to determine a Doppler shift value. At step 906 the Doppler shift values are compared in order to ascertain the speed of objects being detected. At step 908 results of the comparison are transmitted. Using the results obtained in step 906 the speed of traffic or some other object can be determined or approximated. Furthermore, the speed of traffic can be used to provide an indication of traffic density (e.g. if the traffic is moving slowly, it is probable that traffic density is high).

Figure 10:
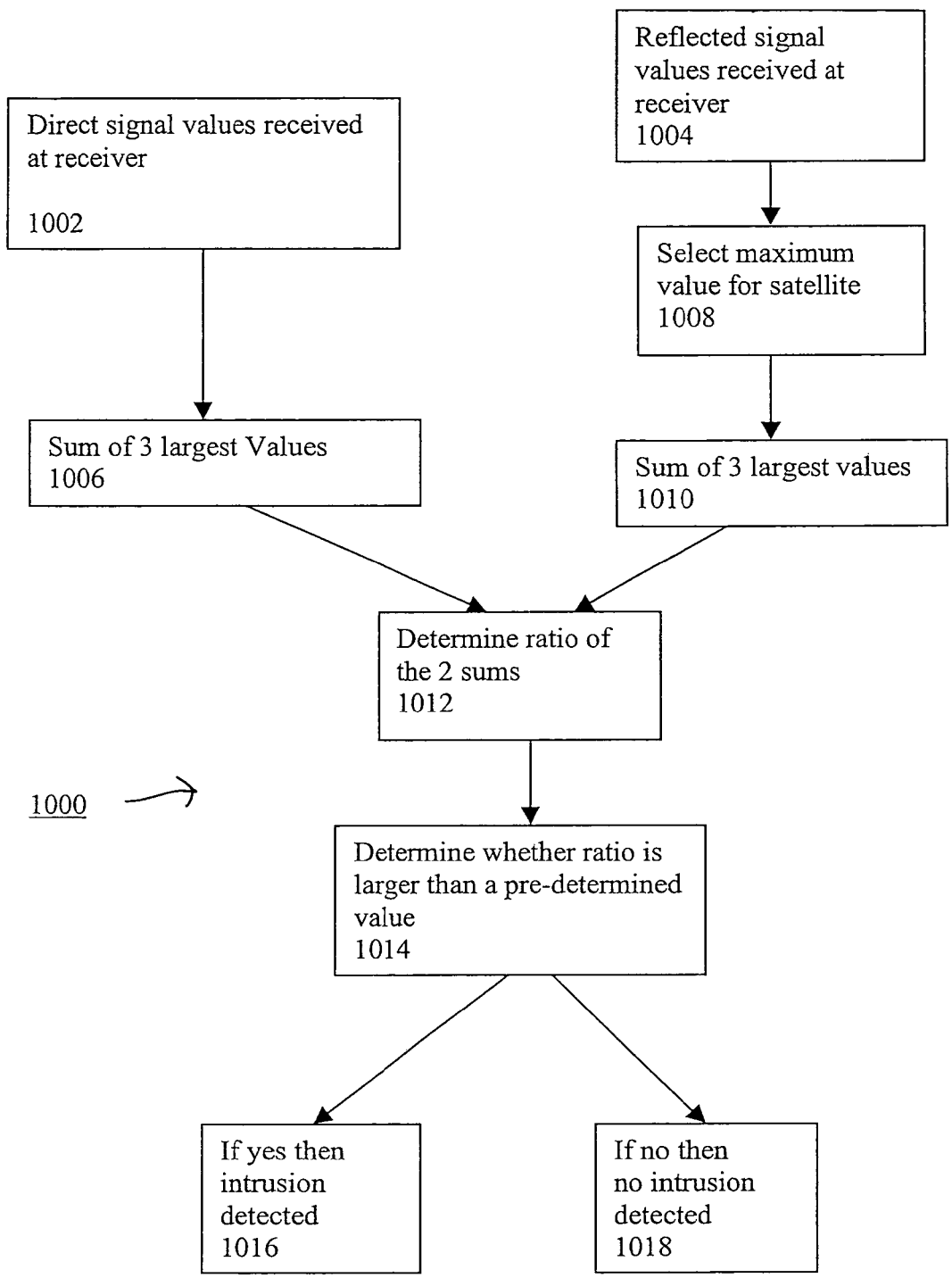
FIG. 10 is a flow chart showing a method for providing security-related information.

FIG. 10 shows security method 1000. Security method 1000 can be used to determine if and when there is an intrusion at a location being monitored by receiver 100. Step 1002 involves receiving six direct GPS signal values per one-second data-logging interval at receiver 100 via RCHP direct signal antenna 110. Again, the number of signal values may be varied within the scope of the present invention. Step 1004 involves receiving reflected GPS signals at receiver 100 via LCHP reflected signal antenna 120. In the example, 192 reflected values per one-second data-logging interval were used, however this value can also be varied within the scope of the present invention.

Step 1006 calculates the sum of the three largest values taken from RCHP direct signal antenna 110 using processor 102. In step 1008 the maximum reflected GPS value is selected from each satellite from which a reflected GPS signal 117 is received. Alternatively, more values can be used for each satellite than just the maximum value, and the average, or mean of the values received can be used instead. Step 1010 calculates the sum of the three largest values received from the reflected signal antenna 120 using processor 102. At step 1012 processor 102 calculates the ratio of the sums of the largest values of the direct and reflected signals. The ratio is then compared at step 1014 to a predetermined calibration value. The predetermined calibration value is a number that represents the results of calibration tests performed to indicate the presence or absence of an intruder. At step 1016, if the calculated value is larger than the predetermined calculation value, then an indication is given that an intruder has entered the detection area. At step 1018, if the calculated value is smaller than the predetermined calibration value then an indication is given that there is no intruder present.

The results obtained at step 1014 can be sent to a database 112, or to a controller 116. In the event that the data is sent to controller 116, an alarm can be triggered, or a notification can be sent. Alternatively, the controller can activate a device, such as a camera, or some other device to visualize or seal off the detection area. When the results are sent to database 112, a log of intrusions can be kept for further review.

Figure 11:
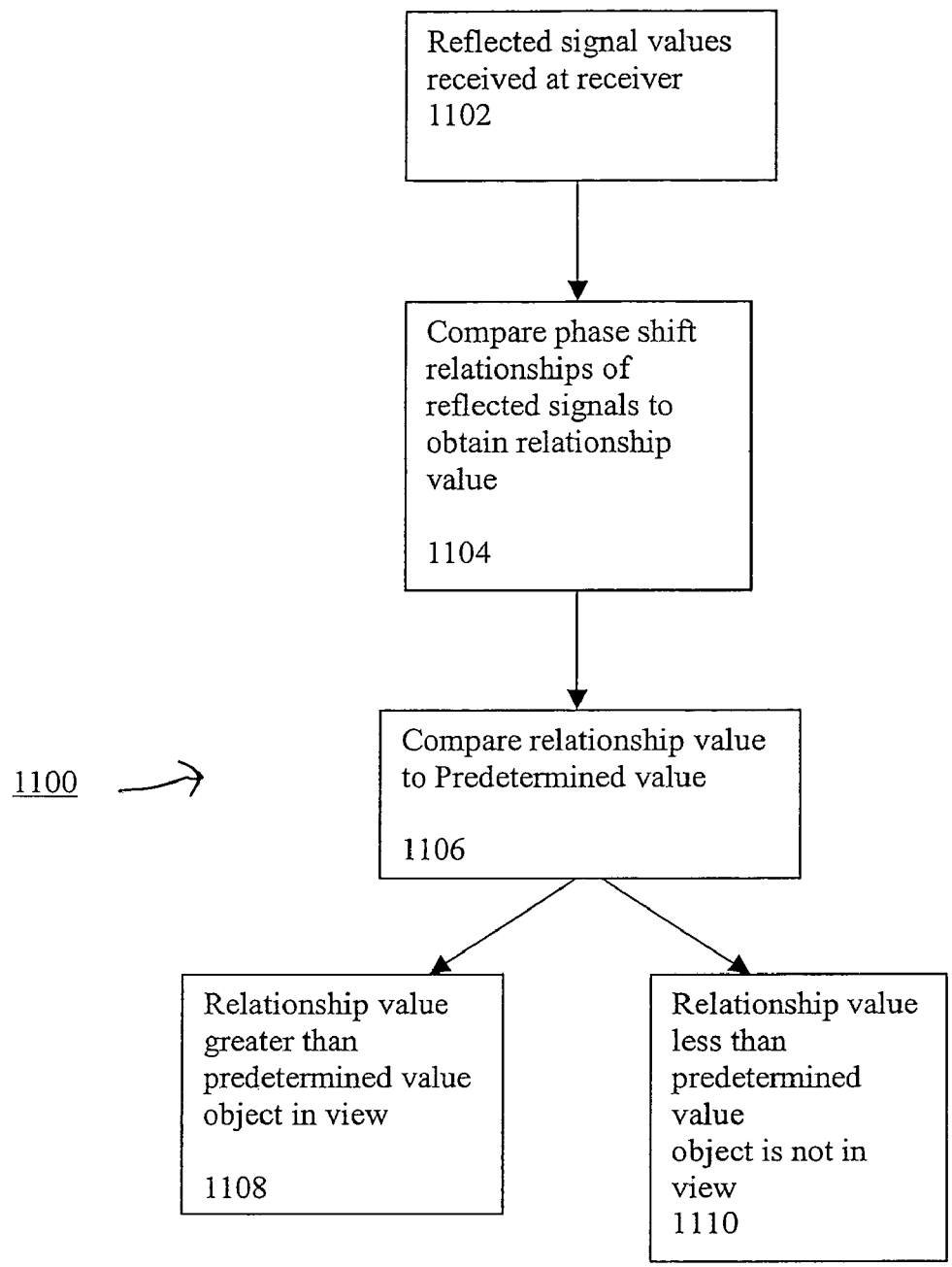
FIG. 11 is a flow chart showing a method that involves phase shift detection.

FIG. 11 describes phase shift detection method 1100. At step 1102 reflected GPS signals 117 are received via LCHP reflected signal antenna 120 at receiver 100. At step 1104 the phase shift relationships of reflected GPS signals 117 are compared in order to obtain a phase shift relationship value. Processor 102 compares the phase shift relationship value to a predetermined phase shift relationship calibration value at step 1106. At step 1108 if the calculated phase shift relationship value is greater than the predetermined phase shift relationship calibration value, then an object is in view. At step 1110 if the calculated phase shift relationship value is less than the predetermined phase shift relationship calibration value, then the object is not in view.

The phase shift detection method 1100 is useful for further refining the information received from reflected GPS signals 117. By detecting a phase shift, the reliability of detecting an object or intruder can be improved.

Figure 12:
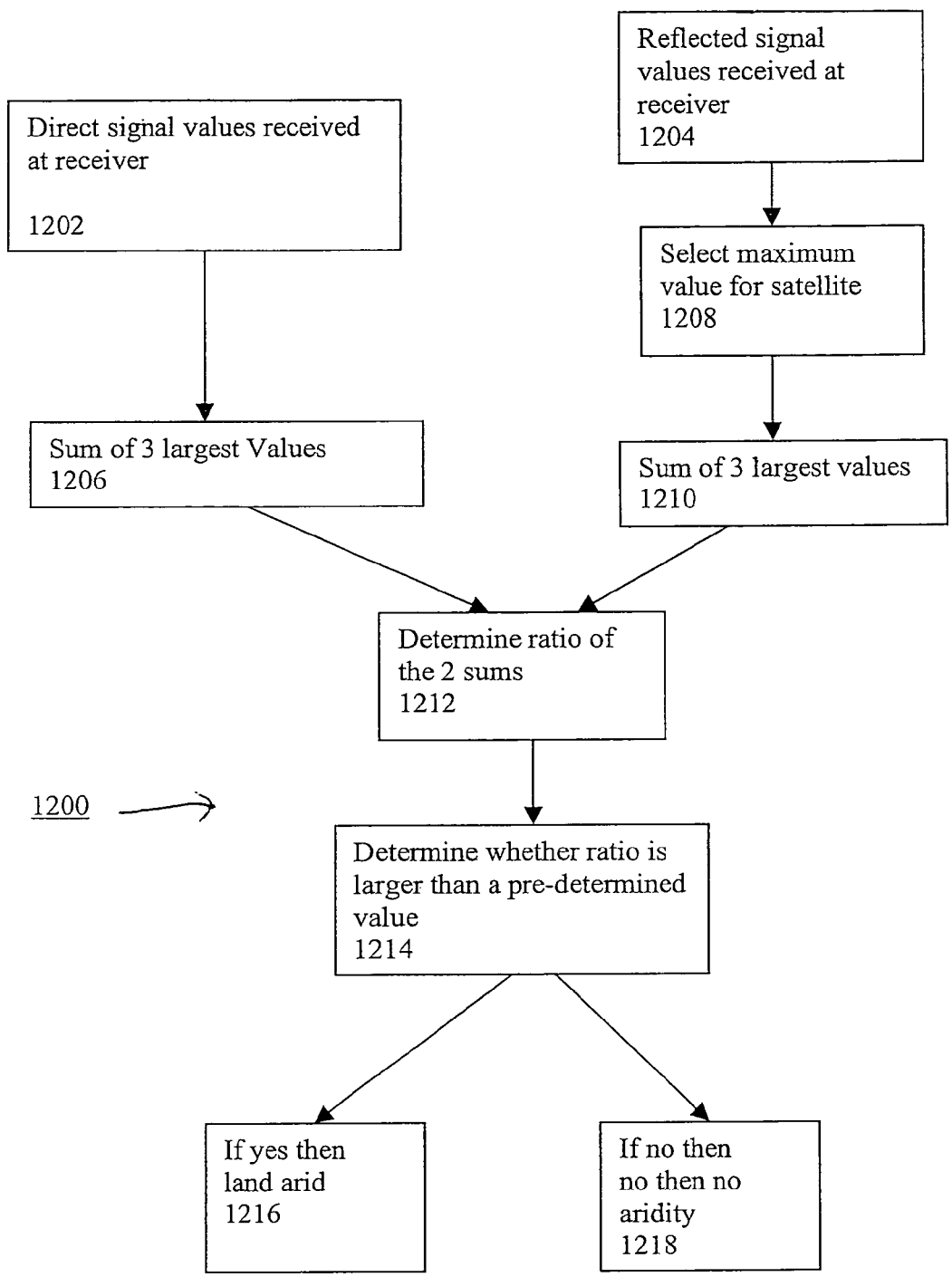
FIG. 12 is a flow chart showing a method for determining the aridity of land.

FIG. 12 shows an aridity detection method 1200. Aridity detection method 1200 is used for detecting whether or not land is arid (e.g. a field or lawn has not received rain for a period of time). Step 1202 involves receiving six direct GPS signal values per one-second data-logging interval (1 second) at receiver 100 via RCHP direct signal antenna 110. Again, different numbers of values may be used within the scope of the present invention. Step 1204 involves receiving reflected GPS signals at receiver 100 via LCHP reflected signal antenna 120. In the example, 192 reflected values per one-second data-logging interval were used, however this value can vary within the scope of the present invention.

Step 1206 calculates the sum of the three largest values taken from RCHP direct signal antenna 110 using processor 102. In step 1208 the maximum reflected GPS value is selected from each satellite from which a reflected GPS signal 117 is received. Alternatively, more values can be used for each satellite than just the maximum value, and the average, or mean of the values received can be used instead. In step 1210, processor 102 calculates the sum of the three largest values received from the LCHP reflected signal antenna 120. At step 1212 processor 102 calculates the ratio of the sums of the largest signal values. The ratio is then compared at step 1214 to a predetermined calibration value. The predetermined calibration value is a ratio that represents the results of calibration tests performed to indicate moisture content of the monitored land. At step 1216, if the calculated value is larger than the predetermined calibration value, then an indication is given that the land being monitored is too dry. At step 1218, if the calculated value is lower than the predetermined calibration value, then an indication is given that the land being monitored is not too dry.

The result determined at step 114 can be sent to controller 116 so that, for example, a sprinkler system can be activated. Alternatively, the results could be sent to a farmer to indicate that crops need to be watered.

Although the invention has been described in the context of several examples, the invention can be employed for a wide variety of purposes. For example, the invention can be employed to monitor or guide vehicle speeds on roads, to monitor and provide information about traffic, to provide real-time traffic or speed information to vehicle operators, thereby allowing them to adjust speed or choose alternate routes, to provide capacity information for parking lot managers or clientele, to measure potential customer base by monitoring parking lots, passers by, etc., and to measure any activity, including persons or animals, or the presence or absence of objects. The invention can also be employed to determine information about land, such as aridity, topographical features and other characteristics that influence the reflectivity of GPS signals. For example, the apparatus of the present invention could be employed to control a lawn watering system. Another use of the present invention is for home security, in which case the occupants of a house can be notified of the approach of a car, person or wild animal. The present invention is particularly useful when stealth is required since the monitoring system is passive and thus can be used without fear of detection.

The invention can also be employed, for example, for applications that rely on digital imaging. Exemplary applications are detecting the presence of buildings, people, and objects of various types, as well as providing images of geographic areas based on such detection.

For the purpose of the following examples of the invention, data was collected containing the time of measurement, the satellites being tracked, the relative power of each direct signal in digital units, and the power of reflected signals of the satellites being tracked, also in digital units. For the reflected power, 32 values were recorded for each satellite in one interval and the 32 values corresponding to the code-correlated power at 32 different time delays measured by the number of code chips or 0.1 ms. For an approximately three minute test, about 180 direct power values were measured for each of the six satellites and 720 reflected values were measured for each of the six satellites.

EXAMPLE 1

In this example, the data collected using the apparatus of FIG. 4, and depicted graphically in FIG. 5, was employed to determine the absence or presence of an aluminum-covered box at a particular geographic location. Using this simple test apparatus, it was determined from the limited amount of collected data that the cut-off value for indicating the presence or absence of the aluminum-covered box was 0.1418. This value was obtained by calculating as follows:

mean (mean(with Al box)−std(with Al box), mean (no box)−std(no box))

The determined cut-off value was then applied to the decision rule of FIG. 4, one instance at a time (in real time). The cumulative result of decision making for all data point in all six tests is shown in Table 3 below.

TABLE 3

| Decision Made | No Al Box Actually Present | Al Box Actually Present |
|---|---|---|
| No Al Box Present | 88.68% | 11.32% |
| Al Box Present | 15.97% | 84.03% |

From these results it can be seen that the probability of a correct decision, relative to the probability of an incorrect decision is very high, indicating a good correlation between the reflected GPS signals and the presence or absence of the aluminum-covered box.

EXAMPLE 2

In this example, the data collected for a parking garage using the apparatus of FIG. 6 and depicted graphically in FIG. 7, was employed to make a decision about the parking lot. More specifically, a cut-off value was calculated using the same methodology as in Example 1, with the resultant cut-off value being 0.2116. For the purpose of this example, the system was calibrated to decide whether the parking lot had many cars present or only a few cars present. Based on analysis of the data using this cut-off value, correct decisions were made 70.18% of the time when the parking lot had only a few cars present, and 75.88% of the time when the parking lot had many cars present.

EXAMPLE 3

For the above examples GPS signals were used. For example 3 reflected DirecTV® satellite signals were used. A correlation between the power of reflected satellite waves and the presence of a vehicle was established in order to yield traffic data for a single lane of traffic. Traffic data included the number of vehicles passing per minute and average vehicle velocity.

In the example the following equipment was used. A Terk 18" Parabolic Satellite Dish with a maximum gain of 33.459 dBi (2000×) at 12.2 GHz, with the maximum gain following the equation $G_{dBi}=10*\log_{10}[(\rho_e*4\pi*\pi r_D^2)/\lambda^2]$. The satellite dish has a 3 dB beam width of 3.76°, wherein $b_w=70*\lambda/d$. The satellite dish has a circular ground reflection Area of 8.476 ft$^2$ wherein the circular reflection area is $A_C=\tan(b_w)*h$. The satellite dish is high gain/low beam width device in order to account for low signal strength.

Also used was a low noise blockdown converter (LNB). Depolarization with the LNB was circular to linear. The LNB performed frequency down-conversion by 11.25 GHz. The LNB utilized a band-pass filter of 12.2 to 12.7 GHz. Amplification was 56 dB/398,107×.

Also utilized was a satcom digital signal strength meter. The satcom digital signal strength meter displays dish output power on a digital LCD display. Units displayed were logarithmic. The attenuation scale was 0 dB maximum power and inverse to the actual power.

In this example, the equipment was used in six test trials. Three test vehicles were used with two trials per a vehicle. The test locations were 32$^{nd}$ and Walnut Streets in Philadelphia, Pa. at a semi-enclosed area that was adjacent to a four-story building and a twelve-foot wall and at 38$^{th}$ and Walnut Streets in Philadelphia, Pa. at an open area that was adjacent to a flat grassy area. Weather during the trials varied from heavy precipitation to clear skies.

Figure 13:
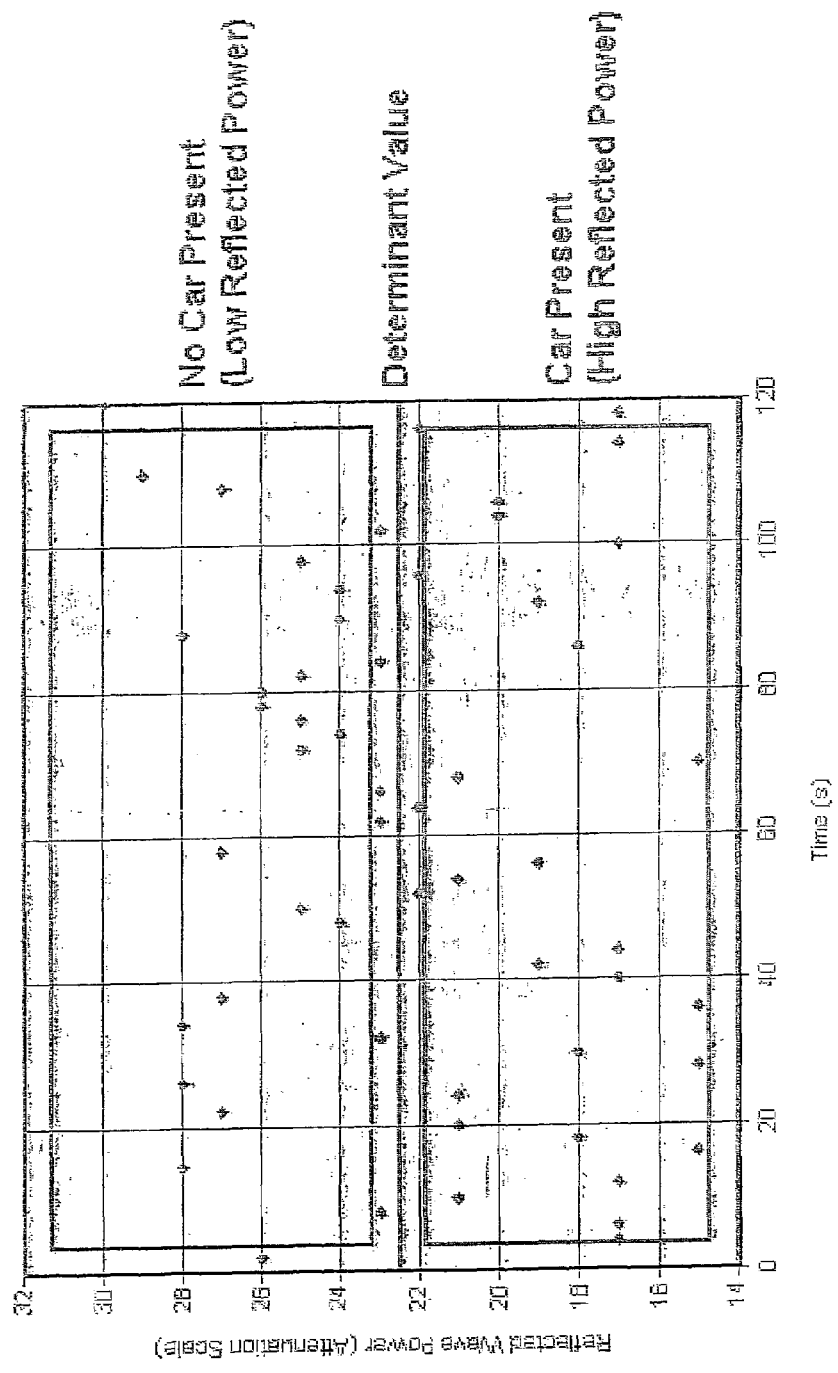
FIG. 13 is a graphical depiction of test data received for determining a number of vehicles on a road.

Before each test trial a viable target area was located. The antenna/receiver dish was positioned above the target area (for example on an overpass) and directed downwards. During a test trial, a test vehicle would pass beneath the antenna/receiver dish from between 8 to 12 times. Data points were collect in 2 second intervals for 120 seconds with the following information collected; time (sec.), reflected wave power (attenuation units), and observation of vehicle presence (yes or no). The test data is shown in FIG. 13.

The test data was then subjected to the following steps. First the three input variables were gathered; Time (t), reflected power with respect to time ($p_R(t)$); and the observed presence of a vehicle with respect to time ($p_O(t)$), wherein $p_O(t)=1$ with a vehicle present and $p_O(t)=0$ without a vehicle present.

A boundary value ($v_t$) was then calculated in order to calibrate the system. Boundary value $v_t$ is a calculated value between data points that indicate a presence of a vehicle and data points that don't indicate the presence of a vehicle. The boundary value ($v_t$) is calculated using the following equation; $v_t=[\min[p_F(t)*[1-p_O(t)]]+\max[p_F(t)*p_O(t)]]/2$. The boundary value was determined once per location.

A determination of the presence of a vehicle can then be made based upon the reflected power with respect to time ($p_R(t)$ and the Boundary value $v_t$. The presence of a vehicle is denoted by $p_C(t)$. If $p_P(t)>v_t$, $p_C(t)=0$, if $p_P(t)<v_t$, $p_C(t)=1$. This value is then used to increment a car counter variable in order to determine the number of cars that have passed a given area. FIG. 14 shows a chart indicating the location, temperature, weather, and accuracy of the test.

Average velocity can also be determined by using the time when car "n" leaves the dish's field of view ($t_L(n)$) and the time when car "n" enters the dish's field of view ($t_E(n)$). Average velocity then equals $V_{adj}$=mean ([7 ft/($T_L-T_E$) sec] *(60 sec/min)*(60 min/hr)*(1 mile/5280 ft)). It is assumed that every vehicle is 7 feet long. To account for this in the calculation the $V_{adj}$ is produced using only vehicles that have velocities that fall within one standard deviation of the adjusted mean velocity.

From analysis of the results it was determined that the presence of a vehicle can be predicted to within an accuracy of about 80%. Adjacent structures added noise to the collected data and reduced the accuracy of the system. Furthermore, inclement weather also added noise to the system and reduced accuracy.

Although the above examples utilize GPS signals and DirecTV® signals it is to be understood that the signals from high orbit satellites (e.g. a DirecTV® satellite), middle orbit satellites (e.g. a Global Positioning System (GPS) satellite), and low orbit satellites (e.g. low Earth orbit (LEOS) satellite altimetry systems) can also be used in the method of this invention. However, it is advantageous if the satellite used is broadcasting a signal without prompting from the user of the method located on the ground since this will reduce cost and offer efficiencies over other methods. One of the advantages of the invention is the ability to utilize existing transmitted signals in order to perform the methods of the invention.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of using reflected satellite signals to determine information comprising the steps of:
   receiving one or more reflected satellite signals from at least one satellite at one or more receivers, said reflected satellite signals being reflected from an object, ground or a combination thereof, prior to reception by said one or more receivers;
   determining a power of said one or more reflected satellite signals;
   comparing the determined power of said one or more reflected satellite signals to a calibrated value of a power obtained from calibration data for said object, said ground or said combination thereof; and
   determining information about said object, said ground, or an area or a location as a result of said comparing step.

2. The method of using reflected satellite signals as set forth in claim 1, wherein said determined information is selected from the group consisting of: traffic volume, aridity of land, a presence or absence of an object, person or animal, topographical features of land, and a number of objects, persons or animals.

3. The method of using reflected satellite signals as set forth in claim 1, further comprising the step of taking an action based on said determined information.

4. The method of using reflected satellite signals as set forth in claim 3, wherein said action is selected from the group consisting of: providing a notification, activating an alarm, transmitting information, and activating a watering system.

5. The method of using reflected satellite signals as set forth in claim 1, further comprising the step of modifying said calibration data using data obtained from one or more of said reflected satellite signals.

6. The method as claimed in claim 5, wherein said step of modifying said calibration data comprises the steps of obtaining information from said data obtained from one or more of said reflected satellite signals, processing said data, and adjusting a result determinative value obtained from said calibration data based on said information obtained from one or more of said reflected satellite signals.

7. The method as claimed in claim 1, wherein said method is employed to determine the presence or absence of an object, person or animal.

8. The method of using reflected satellite signals as set forth in claim 1, wherein said reflected satellite signal is from a high orbit satellite.

9. The method of using reflected satellite signals as set forth in claim 1, wherein said reflected satellite signal is from a low orbit satellite.

10. The method of using reflected satellite signals as set forth in claim 1, wherein said calibration data accounts for weather effects on reflectivity of said reflected signal.

11. The method as set forth in claim 1, wherein said method determines information about the speed of movement of, or tracks, one or more of an object, a person and an animal.

12. The method of using reflected satellite signals as set forth in claim 1, wherein said information is transmitted to a remote location by a form of transmission selected from the group consisting of a cellular transmission, a satellite transmission and a wireless transmission.

13. The method as set forth in claim 1, further comprising the step of comparing a determined Doppler shift of said one or more reflected satellite signals to at least one calibrated value of a Doppler shift obtained from calibration data for said at least one object, said ground or said combination thereof and determining a velocity or movement of said at least one object, as a result of said comparing step.

14. A method for processing satellite signals to determine information comprising the steps of:
   receiving a reflected satellite signal at one or more receivers, wherein said reflected satellite signal is reflected from an object, ground or a combination thereof prior to being received at said one or more receivers;
   comparing a power of said reflected satellite signal to a calibrated value of a power representing said object, said ground or said combination thereof; and
   determining information about said object, said ground, an area or a location as a result of said comparison step.

15. The method as set forth in claim 14, further comprising the step of modifying said calibration data based on data selected from the group consisting of data obtained from one or more of said reflected satellite signals and data regarding the effects of weather on said reflected satellite signals.

16. The method as set forth in claim 14, further comprising the step of taking an action based on said determined information.

17. The method as set forth in claim 16, wherein said action is selected from the group consisting of: providing a notification, activating an alarm, transmitting information, and activating a watering system.

18. The method as set forth in claim 14, wherein said method determines information about the speed of movement of, or tracks, one or more of an object, a person and an animal.

19. The method as set forth in claim 14, wherein said method captures an image of, or determines a presence or absence of one or more of an object, a person and an animal.

20. The method as set forth in claim 14, wherein said receivers process a reflected satellite signal selected from the group consisting of an optical signal, a microwave signal, a radar signal and an ultrasound signal.

21. The method as set forth in claim 1, further comprising the step of comparing a determined phase of said one or more reflected satellite signals to at least one calibrated value of a phase obtained from calibration data for said at least one object, said ground or said combination thereof and determining a velocity or movement of said at least one object, as a result of said comparing step.

* * * * *

UNITED STATES PATENT AND TRADEMARK OFFICE
CERTIFICATE OF CORRECTION

PATENT NO. : 7,564,402 B2  
APPLICATION NO. : 11/187133  
DATED : July 21, 2009  
INVENTOR(S) : Bruce A. Eisenstein Page 1 of 1

It is certified that error appears in the above-identified patent and that said Letters Patent is hereby corrected as shown below:

On the title page, items:

[12] change "Einstein" to --Eisenstein--

[75] change "Bruce A. Einstein" to --Bruce A. Eisenstein--

Signed and Sealed this

Twenty-second Day of September, 2009

David J. Kappos
*Director of the United States Patent and Trademark Office*